R. W. DAVIS.
LOCKING DEVICE FOR LUBRICATOR PLUNGERS.
APPLICATION FILED NOV. 6, 1913.
1,129,173.
Patented Feb. 23, 1915.
2 SHEETS—SHEET 1.
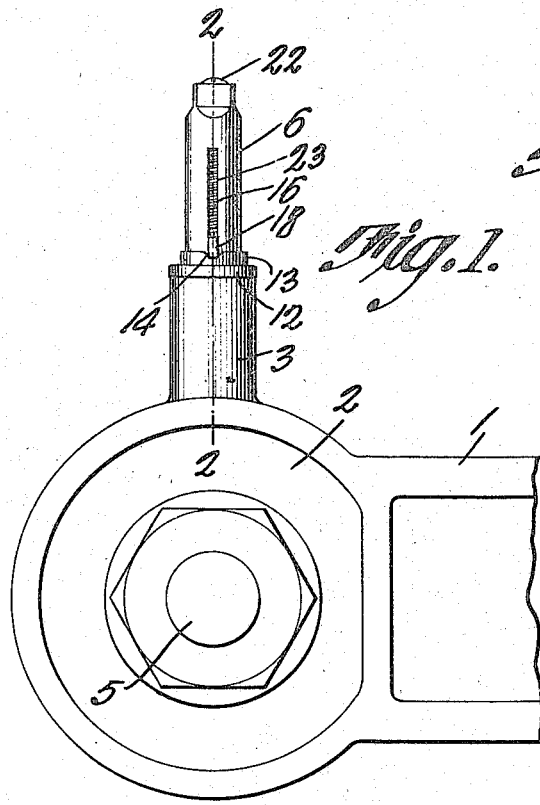
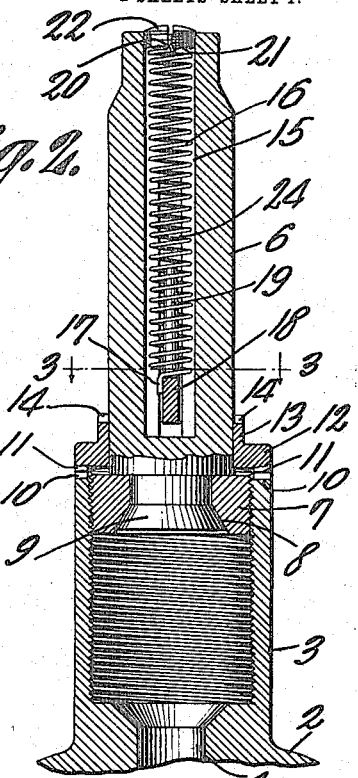
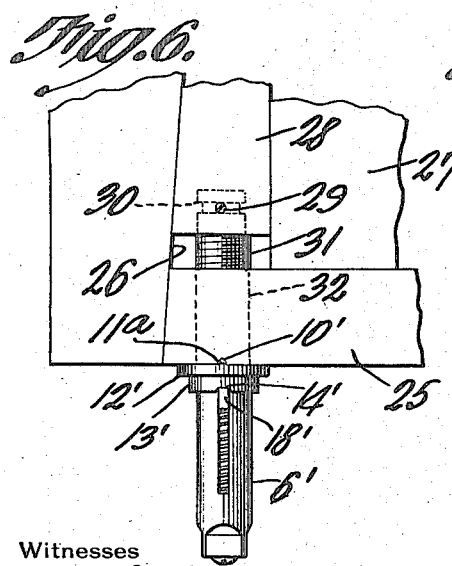
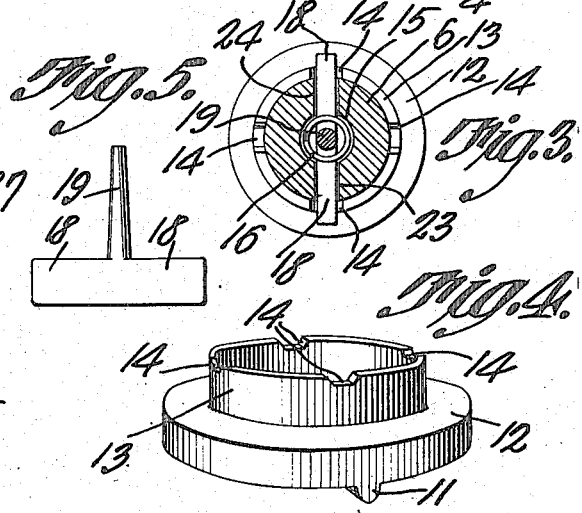
Witnesses
R. W. Davis
Inventor
by Attorneys

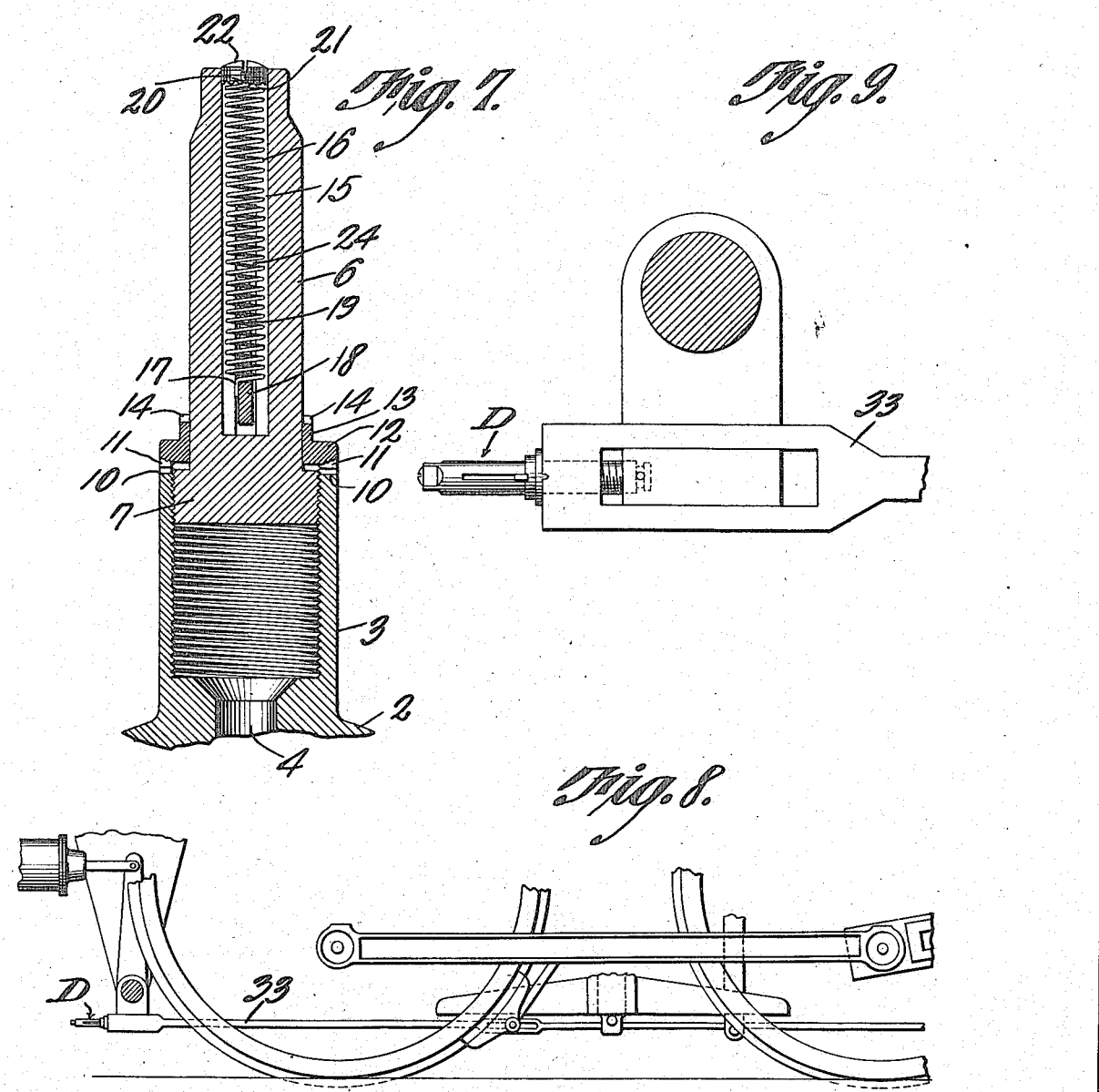

UNITED STATES PATENT OFFICE.

RAY W. DAVIS, OF BROWNSVILLE, PENNSYLVANIA, ASSIGNOR OF ONE-HALF TO JAMES RYAN, OF SOUTH BROWNSVILLE, PENNSYLVANIA.

LOCKING DEVICE FOR LUBRICATOR-PLUNGERS.

1,129,173. Specification of Letters Patent. Patented Feb. 23, 1915.

Application filed November 6, 1913. Serial No. 799,532.

*To all whom it may concern:*

Be it known that I, RAY W. DAVIS, a citizen of the United States, residing at Brownsville, in the county of Fayette and State of Pennsylvania, have invented a new and useful Locking Device for Lubricator-Plungers, of which the following is a specification.

The present invention relates to improvements in locking devices, the object of the invention being the provision of a locking device by means of which two coöperating threaded members may be locked relatively to each other against longitudinal or rotary movements, thus providing a locking means especially adapted for use in connection with lubricators of the plunger and grease cup type, and for locking locomotive drive wheel brake adjusting rods, and wedges or in fact any parts that are subjected to jar upon locomotives or other types of engines and vehicles.

A further object of the present invention is the provision of a locking device especially adapted for use in connection with a lubricator of the grease cup type, and in which the plunger member and the cap carried thereby are locked relatively to each other and the grease cup against accidental rotation, thus providing an attachment which is readily adapted for use in connection with grease cups, which will remain locked in the desired position and which is not affected by the jar of the lubricator.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a side elevation of a connecting rod and pin with the present attachment in operable relation thereto. Fig. 2 is a section taken on line 2—2 of Fig. 1, the parts being enlarged. Fig. 3 is a section taken on line 3—3 of Fig. 2. Fig. 4 is a perspective view of the slidable and rotatable sleeve used in connection with the present attachment. Fig. 5 is a side elevation of the resiliently held locking bar carried by one of the main members of the attachment. Fig. 6 is an elevation illustrating the application of the present invention to a wedge for locomotive drive wheel boxes. Fig. 7 is a view similar to Fig. 2 showing a solid headed rotatable member. Fig. 8 is a side elevation of an adjusting bolt for locomotive drive wheel brake adjusting rods as in use. Fig. 9 is an enlarged detail view of the adjusting bolt with the present lock applied.

Referring to the drawings, the numeral 1 designates a connecting rod, whose head or coupling member 2 is provided with the grease cup 3, of the lubricator. This structure is indicative of any structure now employed for this purpose, the present attachment, as will presently appear, being readily applicable to this form of grease cup without in any manner greatly changing the structure thereof. The port 4 leads from the grease cup to lubricate the contact around and upon the pin 5.

The attachment includes the rotatable member 6 having the lower enlarged and exteriorly threaded head 7, for coöperation with the interior screw threads of the cup 3. In the form shown, as clearly illustrated in Fig. 2, the lower end of the member is counterbored as at 8, for the reception of the snugly fitted or riveted head 9. It is possible, however, as in Fig. 7, to make the head 7 a solid head without the employment of the member 9. The upper edge or rim of the grease cup 3 is provided with two diametrically disposed notches or recesses 10, this being the only alteration necessary upon grease cups for the application of the present attachment. These recesses 10 are formed for the reception of the locking lugs 11, there being two carried upon the under side of the ring 12. This ring 12 is provided with the upstanding sleeve 13 which is integral therewith. The complete ring with the sleeve or collar 13 is disposed for slidable and rotary movements upon the cylindrical portion of the member 6, the engagement of the lugs 11 with the recesses 10 holding the ring 12 against rotation relatively to the grease cup 3, while in the upper rim of the sleeve 13 are provided a plurality of paired notches or recesses 14, the purpose of which will presently appear.

The member 6 is provided with a central bore 15, in which is inserted the coiled spring 16, the lower terminal 17 of which is disposed to engage the cross bar 18, which is carried by the tapered pin 19, the said pin 19 being disposed to enter the lower end of the spiral spring 16, so that said spring will exert a tension downwardly upon the cross bar 18 so as to hold the projecting ends thereof in two of the notches 14, and thus provide a resilient lock to hold the sleeve 12 against rotation. The upper end 20 of the spring 16 is tapered, as clearly illustrated in Fig. 2, and is adapted to be engaged by any one of the serrations or indentations 21 of the locking nut 22, said nut 22 being threaded into the upper open end of the bore 15. By this means, the spring 16, may be pushed downwardly by inserting an instrument, as a screw driver through the slot 23, so that the screw 22 may be rotated as far as desired at which time, the spring is released and the end 20 engages one of the serrations of the screw and thus the spring locks the screw to prevent its accidental loosening.

Two diametrically disposed elongated slots 23′ and 24 are provided through the body of the member 6, and lead into the central bore 15 thereof. These slots are of sufficient width to permit of the introduction of the bar 18 and its pin 19 through the same for engagement with the spring 16, which is placed through the open end of the bore 15 when assembling.

From the foregoing description, it is evident that the member 6 may have its head 7 introduced to the desired distance within the grease cup 3, to cause the necessary pressure upon the lubricant therein so that any proper feeding action upon the same will be permitted. In many cases it is impossible to lock this member against accidental rotation and displacement, and therefore causes the release of the pressure upon the grease, and especially where the present device is used upon the connecting rod of a locomotive and is necessarily subjected to jars. It will therefore be apparent that with the present structure, that the bar 18 and the ring 12, due to the distance of the head 7 within the grease cup 3 will cause the compression of the spring 16, accordingly, the lugs 11 of the ring 12 registering and seating within the notches 10 of the grease cup 3, and thus holding the ring 12 against rotation independently of the grease cup 3, while the bar 18 due to the pressure exerted thereupon by the spring 16, and its interengaging with the alined notches 14 of the sleeve 13, will thus lock the member 6 against rotation independently of the ring 12. Thus the grease cup 3 locks the ring 12 against rotation, and the coöperation of the notches 14 and the bar 18 with the ring 12 permits the ring 12 to lock the member 6 against rotation. It will also be seen that due to the resilient locking of the bar 18 in such position, that the member 6 may be rotated manually to release the plunger or head 7 when desired, that is when filling the cup 3 or when increasing the pressure upon the lubricant therewithin.

In order to demonstrate the use of the present locking device in connection with other means, attention is invited to Fig. 6, wherein the frame 25 contemplates the frame of a locomotive drive wheel box 27, a wedge block 28 of usual structure being employed, and coöperating with the adjacent face of the box 27 and the inclined face 26 of the frame so as to hold the box 27 in the desired position, this structure being similar to that generally used in connection with locomotives. In this instance, the grooved head 20 of the cylindrical threaded member 31 is employed to enter a socket within the lower end of the wedge 28, the same being locked relatively thereto by means of a screw 29, or any other means that will permit the rotation of the member 31 to impart the desired wedging action to the wedge 28. The frame 25 is provided with the threaded socket 32, in which fits the threaded portion of the member 31, oppositely disposed recesses 10′ being provided in the under side of the frame 25 for the reception of the locking lugs 11ᵃ of the ring 12. The member 6′ is constructed similarly to the member 6 heretofore described, while the bar 18′ carried by the member 6′ resiliently engages the notches 14′ of the sleeve 13′ and thus the ring 12′ holds the member 6′ in the desired interlocking relation to the frame 25 through the instrumentality of the locked ring 12′.

As shown in Figs. 8 and 9, the locking device D is shown as connecting with the locomotive drive wheel brake adjusting rod 33, and is constructed similarly to that shown in Fig. 6. It is therefore evident that the present locking device is adapted particularly to be used upon machinery wherein the same is subjected to jars, as upon a locomotive or other types of engines and vehicles.

What is claimed is:

1. A device of this character, including an interiorly threaded member, a cylindrical member having an exteriorly threaded lower end for engaging the threaded portion of the first member, a ring mounted for rotation and sliding movement upon the cylindrical portion thereof, coöperating means carried by the ring and interiorly threaded member for locking the ring against rotation, and a spring pressed bar carried by the cylindrical member for bearing upon the ring to lock the movable threaded member against rotation.

2. A device of this character, including an interiorly threaded lubricating cup, a cylindrical member having an enlarged exteriorly threaded lower end for interlocking with the threaded portion of the cup, a ring mounted for rotation and sliding movement upon the cylindrical portion thereof, coöperating means carried by the ring and the cup for locking the ring against rotation, and a spring pressed bar carried by the cylindrical member for bearing upon the ring to lock the movable threaded member against rotation.

In testimony that I claim the foregoing as my own, I have hereto affixed my signature in the presence of two witnesses.

RAY W. DAVIS.

Witnesses:
CHARLES A. FULTON,
HOWARD B. STAPLETON.